United States Patent

Couttenier

[11] Patent Number: 6,004,413
[45] Date of Patent: Dec. 21, 1999

[54] METHOD FOR MAKING A LAMINATE AND DEVICE FOR THE APPLICATION OF THIS METHOD

[76] Inventor: André Couttenier, Vrijheidslaan 111/3, Brussels, Belgium

[21] Appl. No.: 09/077,897

[22] PCT Filed: Dec. 17, 1996

[86] PCT No.: PCT/BE96/00133

§ 371 Date: Jun. 16, 1998

§ 102(e) Date: Jun. 16, 1998

[87] PCT Pub. No.: WO97/22473

PCT Pub. Date: Jun. 26, 1997

[30] Foreign Application Priority Data

Dec. 19, 1995 [BE] Belgium ................................. 9501043
Nov. 26, 1996 [BE] Belgium ................................. 9600986

[51] Int. Cl.⁶ .................................................. B32B 31/28
[52] U.S. Cl. ...................... 156/99; 156/273.5; 156/275.5; 156/275.7; 156/379.8; 156/556; 156/578; 156/582
[58] Field of Search ............................... 156/99, 102, 104, 156/272.2, 273.3, 273.5, 273.7, 275.5, 275.7, 379.6, 379.8, 556, 578, 582

[56] References Cited

U.S. PATENT DOCUMENTS

| | | |
|---|---|---|
| 4,717,605 | 1/1988 | Urban et al. ............................... 156/99 |
| 4,999,071 | 3/1991 | Nakamura et al. . |
| 5,695,582 | 12/1997 | Beeteson et al. ........................ 156/99 |
| 5,743,778 | 4/1998 | Arimoto et al. ........................ 156/99 |

FOREIGN PATENT DOCUMENTS

| | | |
|---|---|---|
| 0 635 348 | 1/1995 | European Pat. Off. . |
| 2 161 443 | 7/1973 | France . |
| 2 394 394 | 1/1979 | France . |
| 11 95 914 | 7/1965 | Germany . |
| WO 95 33622 | 12/1995 | WIPO . |

Primary Examiner—Michael W. Ball
Assistant Examiner—Michael A Tolin
Attorney, Agent, or Firm—Bacon & Thomas

[57] ABSTRACT

Method for manufacturing a laminate consisting of at least two plates, which are attached to one another by means of an intermediate layer on the basis of a polymerizable resin, whereby a layer (7) of the polymerizable resin is applied on a horizontally placed plate (1) and whereby a second plate (9) is applied on this layer (7), after which the obtained whole is pressed together and the above-mentioned layer (7) is entirely polymerized, characterized in that between the application of the layer (7) and the application of the second plate (9), the layer (7) is first partly polymerized and this layer (7) is entirely polymerized after the whole has been pressed together.

23 Claims, 6 Drawing Sheets

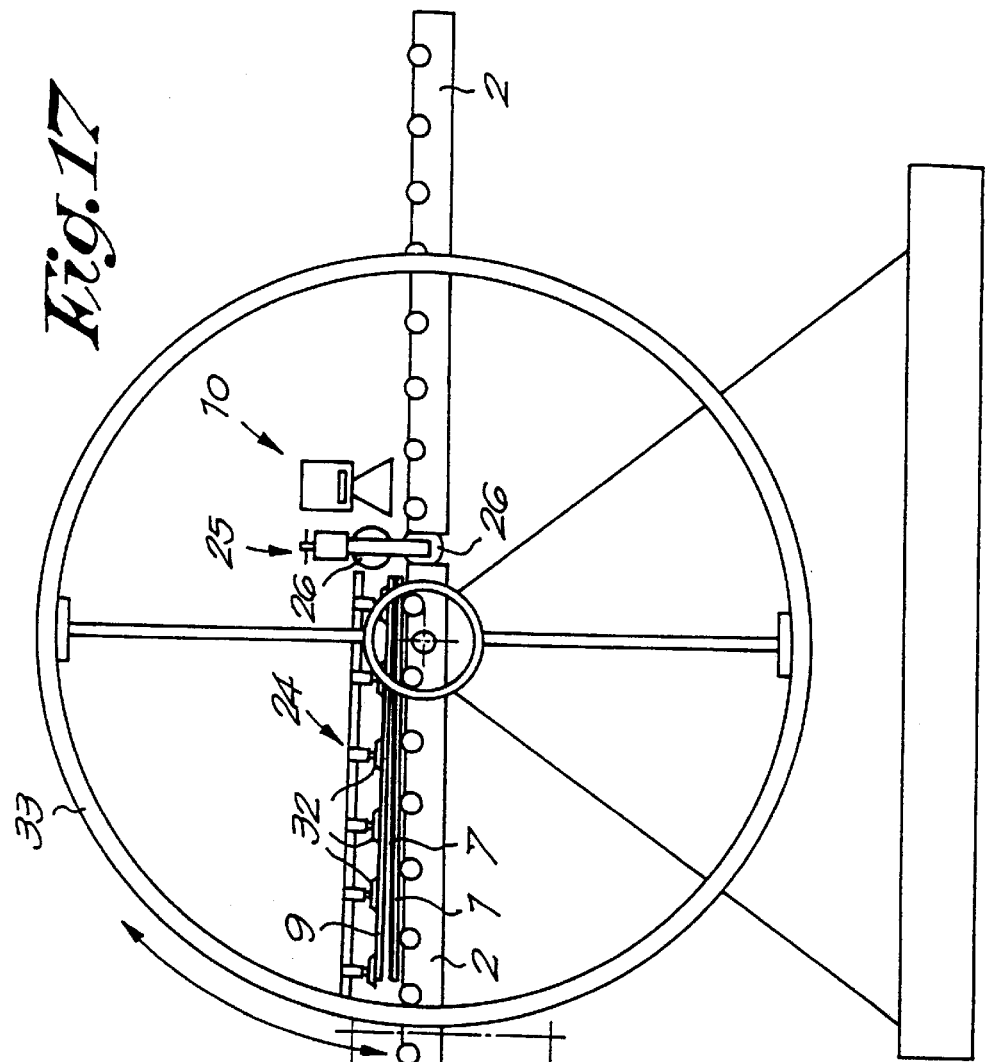
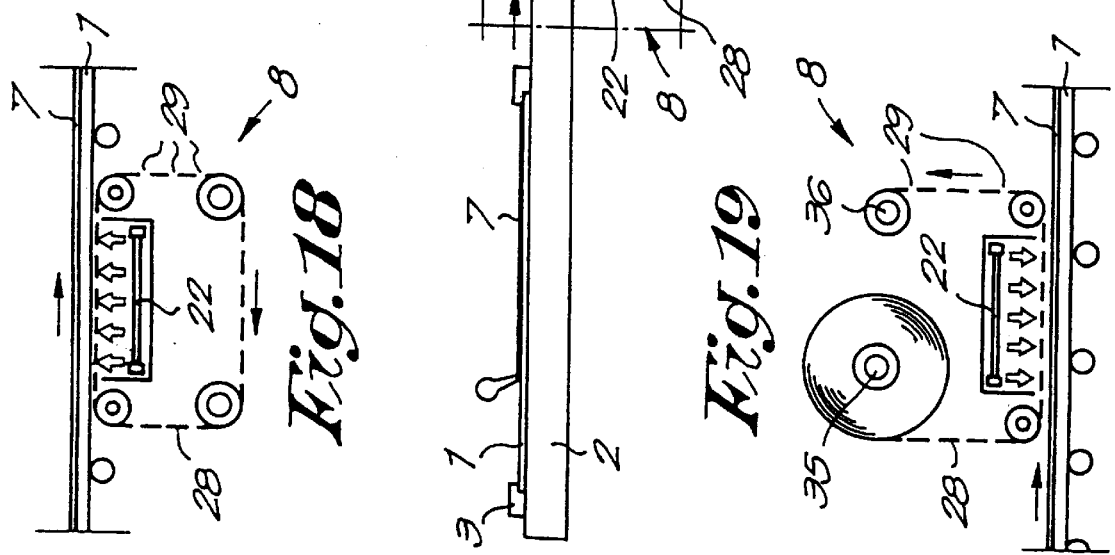

METHOD FOR MAKING A LAMINATE AND DEVICE FOR THE APPLICATION OF THIS METHOD

BACKGROUND OF THE INVENTION

The present invention concerns a method for making laminates, whereby under laminates is understood in particular layers of glass, plastic or other rigid materials which, either or not combined, are attached to one another by means of intermediate layers formed on the basis of a polymerizable mixture such as a resin or a glue.

In particular, the invention concerns a method which is mainly applied in the glass industry for the manufacturing of single- or multi-laminated glass which consists of at least two glass layers in between which is provided a layer of curable resin.

The laminated glass product obtained according to the invention can be used, depending on the resin used, for different purposes such as sound-insulating glass, bullet-proof glass, fire-retardant glass or such, and it can be combined with thermal insulating glass, with double glazing, mirrors, ornamental glass and such.

A known method for manufacturing laminated glass makes use of transparent PVB (polyvinylbutyral) film and/or PU (polyurethane) film and consists in that one or several of the above-mentioned films are provided between two glass plates, after which the whole is heated in an autoclave at a temperature of about 140 degrees Celsius for about three quarters of an hour and is pressed together so as to obtain a good bond and fuse of the films in relation to one another and in relation to both glass plates.

Although, according to this method, an excellent uniform layer thickness is obtained between the glass plates, it is disadvantageous in that the composition, heating and compression cannot be carried out as a continuous process, so that this method can never be implemented entirely automatically.

Another disadvantage is that this method is restricted by the specific characteristics of the PVB film or PU film itself, which implies that laminates with other or special characteristics cannot be realized.

Other known methods are based on placing two glass plates exactly parallel at a required distance, after which the space between these plates is filled with a liquid resin which is then chemically cured, or whereby the whole is exposed to ultraviolet light of a suitable wavelength, as a result of which the resin cures and also bonds to the glass surfaces.

Mostly, the space between the glass plates is filled with resin while the glass plates are placed vertically.

As the hydrostatic pressure of the liquid resin column in the almost vertical position on both glass plates increases towards the bottom, the lower parts of these glass plates tend to move outward, which inevitably leads to a non-uniform layer thickness of the resin. This may cause tension zones in the whole during and after the curing, which may lead to a delamination effect, i.e. the coming off of the cured resin layer on one or both glass plates.

GB 1 367 977 reveals in what manner the disadvantageous effect of the hydrostatic pressure of the liquid resin layer on the glass plates can be remedied by providing a hydrostatic counteracting pressure. To this end, the glass plates are placed vertically in a receiver, whereby this receiver is gradually filled with a liquid and whereby the layer of liquid, curable resin is simultaneously applied between the glass plates. The resin cures as the liquid in the receiver is heated.

An analogous method is described in CH 574 371, whereby the liquid is water.

These methods are time-consuming and cannot guarantee that the glass plates remain nicely parallel.

According to DE 22 26 342 and DE 26 06 569, the liquid, curable resin layer is inserted between the glass plates when they are vertically positioned, whereas the resin is cured between the glass plates when they are horizontally positioned.

The latter methods cannot guarantee that the bulging of the glass plates is entirely remedied as a result thereof, whereby an underpressure is applied in the resin layer according to DE 22 26 342 so as to avoid said bulging as much as possible.

According to GB 20 15 427, the space between the vertically positioned plates is filled with liquid, curable resin on the one hand, and the curing of this resin by means of the exposure to ultraviolet light on the other hand, is carried out step by step in successive layers so as to restrict the hydrostatic pressure in this manner.

The disadvantage of this method is that the curing of a first layer and the subsequent application of the next layer must take place uninterruptedly, since, if the first layer becomes too hard before the next layer is applied, this will result in a visible, very inconvenient horizontal dividing line between these layers.

In U.S. Pat. No. 4,828,784 is applied a similar method whereby an additional lateral pressure can be exerted by means of pressure rollers during the continuous filling and curing of the successive layers of moulding resin.

According to other known methods, a liquid curable resin layer is applied on a horizontally positioned lower glass plate, after which a top glass plate is applied, and whereby the liquid resin is subsequently cured by means of ultraviolet light of a suitable wave length.

An example of such a horizontal positioning is described in DE 27 28 762, but the problem of the bending of the top glass plate on the liquid resin and on the lower glass plate is not discussed.

Another example thereof is described in EP 200 394, in which the lower glass plate is bent such that it represents a concave central zone in which the curable resin is cast and after which a top glass plate is applied thereupon. Hereby, the edges of the laminate in preparation are sealed with tape, such that the thus obtained confinement remains permeable to air, whereas the resin is prevented from dripping out of the laminate in preparation. Subsequently, the lower glass plate is put in a flat, horizontal position, and pressure is then exerted on the top glass plate, so that the resin can spread evenly, whereby the entrapped air bubbles are laterally driven out of the resin at the same time.

U.S. Pat. No. 4,724,023 is based on the same method, whereby the tub shape of the lower glass plate is obtained thanks to a suction cup placed centrally under the glass plate onto which a weight is fixed.

These latter methods are disadvantageous in that the thickness of the resin layer is restricted by the maximal bending and the thus created cavity of the glass plate. Moreover, entrapped air bubbles are hard to avoid and remaining air bubbles are difficult to remove.

Another serious disadvantage is that the top layer, due to its own weight and due to the fact that the resin layer is applied in a liquid state, can bend through in the middle, so that a non-uniform layer thickness is obtained which may possibly result in a delamination of the resin layer.

A common characteristic of all the preceding and other methods making use of the above-mentioned filling processes is that the resin to be used must be sufficiently liquid, which implies that sufficiently high concentrations of monomers, which have a diluting effect on these resins, must be present in the composition. The content of monomers determines the viscosity of the composition which, for the resins used in the above-described methods, have a value situated between 7 and 300 mPa.sec.

A serious disadvantage thereof is that a high concentration of monomers in the liquid resin increases the inflammability and the toxic characteristics of these resins.

Another disadvantage related to the high concentration of monomers in the liquid resin is that, during the curing, the resin layer shrinks significantly, which may cause visible cracks and fissures in this layer, especially if the layer shrinks too fast.

U.S. Pat. No. 4,999,071 discloses a method whereby a glass plate is coated with a heat-polymerizable plastisol, and heated to polymerize partially this plastisol, after which another glass plate is laminated thereon and the laminate is heated to polymerize entirely the plastisol.

BRIEF SUMMARY OF THE INVENTION

The present invention aims a method for manufacturing laminates which totally excludes the above-mentioned and other disadvantages.

To this aim, the invention concerns a method for manufacturing a laminate consisting of at least two plates, which are attached to one another by means of an intermediate layer on the basis of a polymerizable resin, whereby a layer of the polymerizable resin is applied on a horizontally placed plate, the layer is first partly polymerized, and a second plate is applied on this layer, after which the obtained whole is pressed together and the above-mentioned layer is entirely polymerized, characterized in that a photopolymerizable resin is applied and in that the first partly polymerization of the layer is a photolpolymerization by radiation through a mask and the entire polymerization after the whole is pressed together is a photopolymerization by radiation.

The partial curing of the polymerizable layer before a top plate is placed on it offers the advantage that the polymerizable resin layer is first nicely levelled and then serves as a support for the top plate which is thus prevented from bending, so that laminates with perfectly uniform layer thicknesses are obtained and so that the uniform layer thicknesses are obtained and so that the risk of any later delamination is totally excluded.

Another advantage is that thanks to the partial curing of the polymerizable layer, laminates with intermediate layers can be obtained which may vary in thickness.

Another advantage of this method is that the criteria imposed on the liquid characteristics of the resin to be applied are not very critical, so that apart from traditional resins, resins containing few monomers can preferably be applied, which implies that the shrinkage of the polymerizable layer during the curing is strongly reduced.

A low monomer content offers as additional advantages that the inflammability and the toxic effect of the polymerizable resin are strongly reduced.

Moreover, the radiation during the curing process can be shorter and more intense, so that the output of the laminate production is significantly increased.

Another advantage is that the method can be implemented entirely automatically and, as the resin layers can cure rapidly, a very large production capacity can be obtained, which is much larger than the one obtained with the conventional, existing methods.

Although the method according to the invention is meant in the first place to be carried out entirely horizontally, the compression of the plates with the resin provided in between, as well as the final complete curing of this moulding resin, can be carried out at a certain angle according to a special embodiment, so as to obtain that possible air bubbles which are present in or at the surface of the resinous compound can escape more easily.

In both cases, the partial polymerization of the resin layer is obtained by radiating the resin with the use of what is called a mask, so that the resin is only cured locally to a certain degree, in other words according to a certain pattern, so as to obtain the total curing after the plates have been pressed together, as in the previous case.

The invention also concerns devices which are particularly suitable for the application of the method according to the invention.

In order to better explain the characteristics of the invention, the following preferred embodiments of devices applying the method according to the invention are described as an example only without being limitative in any way, with reference to the accompanying drawings, in which:

BRIEF DESCRIPTION OF THE DRAWINGS

FIG. 17 shows a practical application of an embodiment according to FIG. 16;

FIG. 18 shows the part which is indicated by F18 in FIG. 17 to a larger scale;

FIG. 19 shows a variant of FIG. 18.

DETAILED DESCRIPTION OF THE INVENTION

Figure 1:
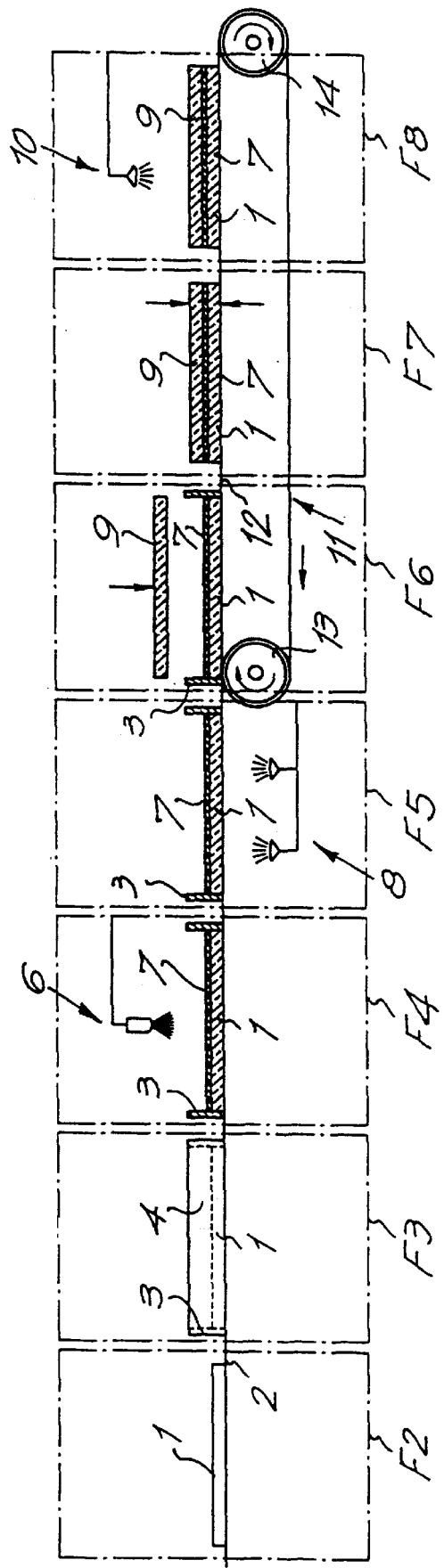
FIG. 1 is a schematic representation of a device for applying a method for making a laminate.
Figure 2:
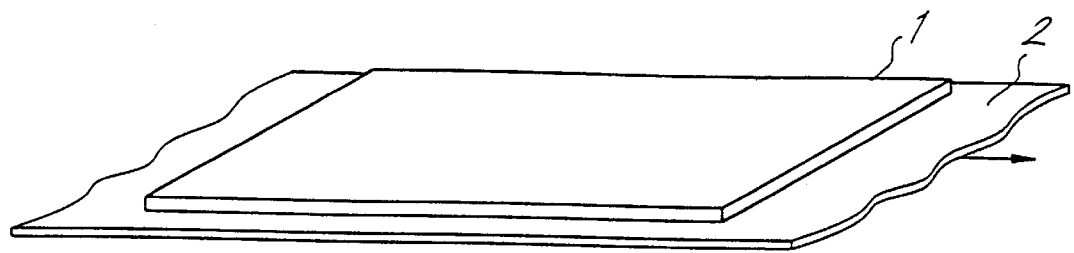
FIGS. 2 to 8 represent the parts indicated in FIG. 1 by F2 to F8 respectively.
Figure 3:
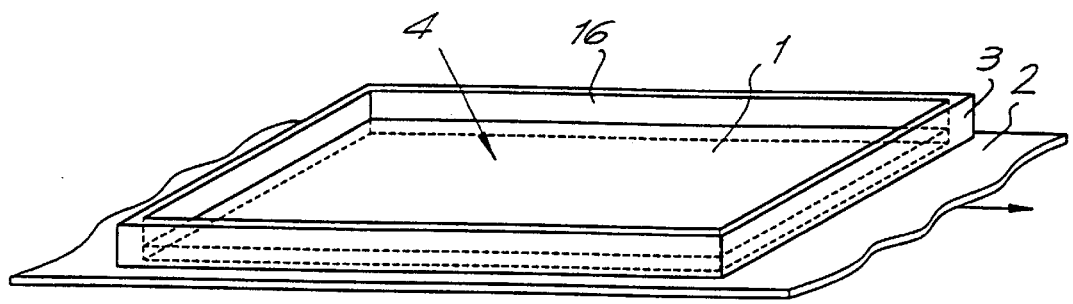

In order to manufacture a glass laminate by means of the device according to FIGS. 1 to 8, one proceeds as follows.

In the first place, a cleaned and dried glass plate 1 is put flat on a completely level support 2.

Then, a suitable confinement 3 is applied along the edges of the glass plate 1 over the entire perimeter, which extends over the glass plate 1, so that a tub-shaped, leak-tight space 4 is created above the glass plate 1.

This space 4 is then filled at least partly with a photopolymerizable mixture or resin, by means of in this case an injection device 6 or any similar means, such as a fixed bar coater under which the glass plate moves at a constant speed so as to form a polymerizable layer 7.

After the layer 7 has been applied, the latter is partially polymerized or cured by means of a radiation device 8 so as to form a gel, after which a second glass plate 9 is applied on this layer 7 and the confinement 3 is removed.

In a subsequent stage, the obtained whole is pressed together, in particular so as to remove air between the second glass plate 9 and the layer 7, and the whole is finally radiated with a radiation device 10 which entirely polymerizes the layer 7.

The support 2 is erected entirely flat and level and provides full support to the first glass plate and forms a static production part which is adjacent to a conveyor device 11 which mainly consists of an endless conveyor belt 12 which runs over rollers 13 and 14.

In the support 2 are provided features, for example plexiglass windows 15, to let the ultraviolet radiation of the radiation device 8 through to the moulding resin layer 7.

According to a variant, the support 2 may also form an air cushion support for the glass plate 1.

The application of the confinement 3 along the edges of the glass plate 1 is preferably done automatically, whereby the confinement 3 is formed of rubber, plastic or teflon-coated metal laths 16 which are suitably connected to one another. Possibly, they can move in relation to one another so as to adjust to different shapes and dimensions of the glass plate 1.

According to another embodiment, the confinement 3 can be formed with a compressible, adhesive and preferably air-permeable tape which is glued on the edge of the glass plate 1 and which must be able to resist the lateral pressure of the polymerizable resin. Usually, the tape is removed after the partial polymerization of the resin, but it can also be removed at a later stage or even not at all, in which cases the tape must be permeable to air.

Figure 4:
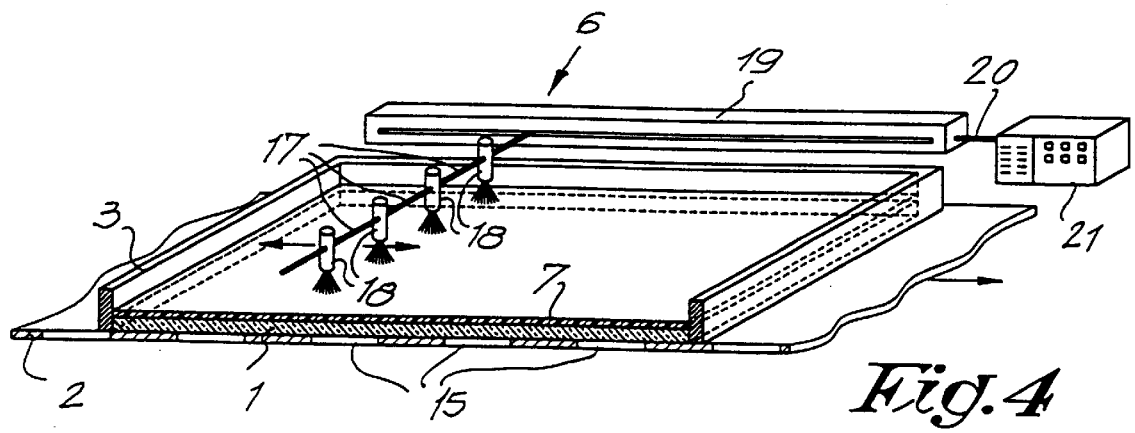

The injection device 6 with which the layer 7 is applied is, as represented in FIG. 4, provided with an injection pipe 17 which extends over the entire width of the support 2 and upon which nozzles 18 are fixed at regular distances. These nozzles 18 can possibly be removed as a function of the width of the glass plate 1 and/or can possibly be provided with an adjustable valve, preferably an electromagnetic shut-off valve.

The injection pipe 17 can be moved in the longitudinal direction of the support 2 at a constant, adjustable speed by means of a transport device 19 and it is connected to a flexible supply line 20 which is connected to a pump which is not represented in FIG. 4 by means of a discharge regulator 21. By means of this discharge regulator 21, the discharge is adjusted as a function of a number of parameters, among others the surface of the glass plate 1 and the required thickness of the polymerizable layer 7, such that an even distribution of the polymerizable resin is obtained on the glass plate 1.

The resins are preferably of the single-component type and are made with specific qualities, such as sound-insulating, burglar-proof, bullet-proof, fire-retardant or other qualities.

The polymerizable resins consist of a mixture which, apart from one or several prepolymers contain one or several components of the group formed of acrylic and methacrylic monomers, vinyl monomers, ethylene monomers, oligomers, photo initiators, additives to improve the stability, adhesion promoters and shrinkage reducers.

As a polymerizable resin can be used conventional photopolymerizable resins, but since the filling is carried out horizontally and is followed by a partial polymerization or curing, preferably several viscous resins can be used apart from these conventional resins, namely with a viscosity between 500 and 50,000 mPa.sec., so that the shrinkage during the polymerization is restricted, which results in a better bond to the glass plate on the one hand, and a weaker mechanical stress field in the resin on the other hand. Therefore, specially developed and/or the most suitable resins are preferably used for this method.

The radiation device 8 with which the layer 7 is partially cured preferably is an ultraviolet oven in which a number of ultraviolet radiation sources 22, provided with UV-lamps which can be separately switched on and off, reflectors and eye protection covers, are preferably built-in in a regular, matrix-shaped pattern in the support 2. The radiation sources 22 are controlled by means of a control device 23 as a function of the dimensions of the glass plates. Thanks to this control device 23, the radiation intensity can be set very precisely. The intensity and length of the radiation are mainly determined by the reactivity of the resin, the concentration of photo-initiators in the polymerizable mixture and the required thickness of the layer 7.

According to another embodiment of the radiation device 8, use is made of an ultraviolet laser and a combination of optical fibres and lenses for the beam diffusion.

According to yet another embodiment, the radiation device 8 with which the layer 7 is partly cured according to a regular pattern is erected at an adjustable height on top of and/or under the layer 7.

Figure 6:
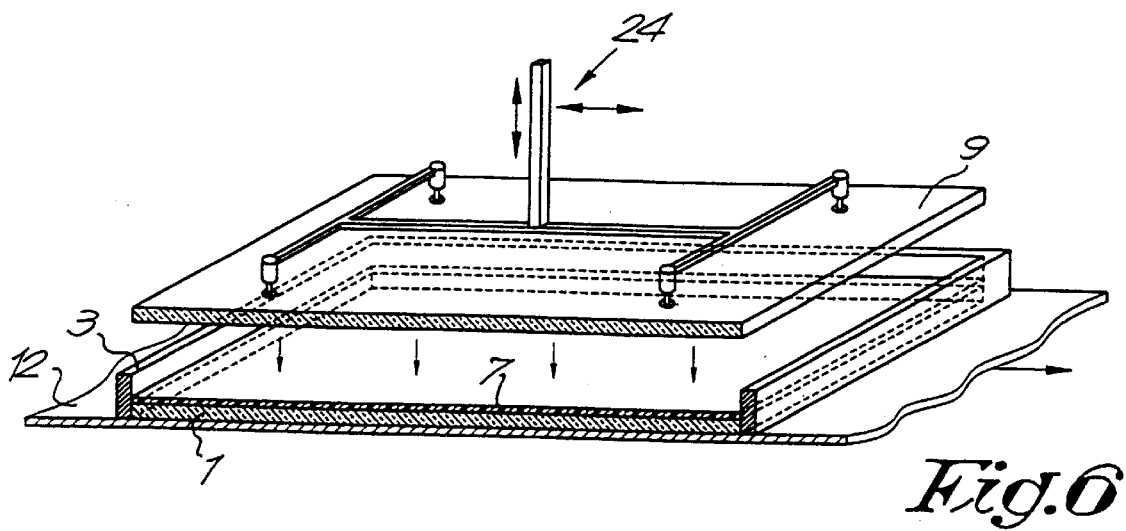

The application and positioning of the second glass plate 9 on the partially polymerized layer 7 is carried out with a pneumatic lifting mechanism 24 which, as represented in FIG. 6, makes it possible to position the glass plate 9 exactly on the polymerized layer 7.

Figure 7:
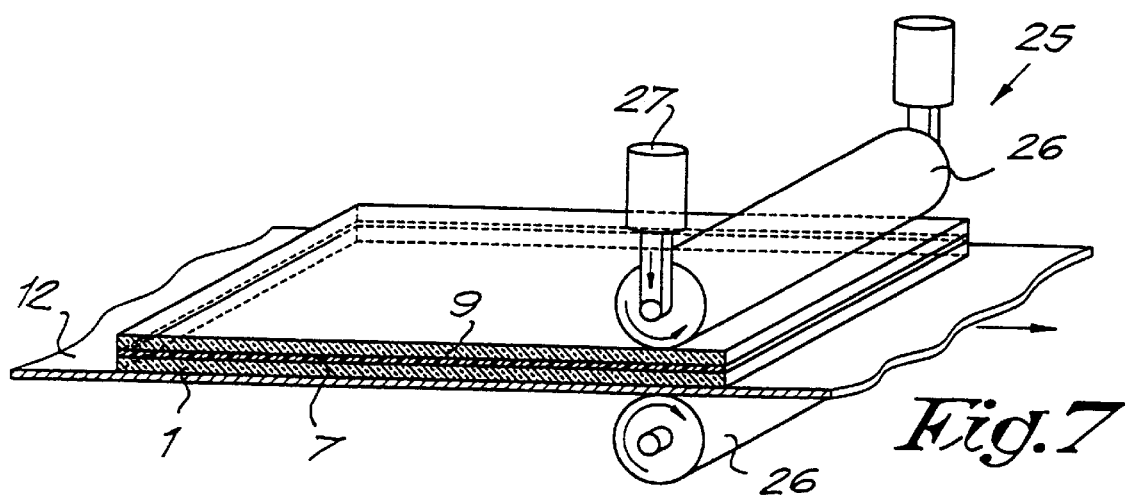
Figure 8:
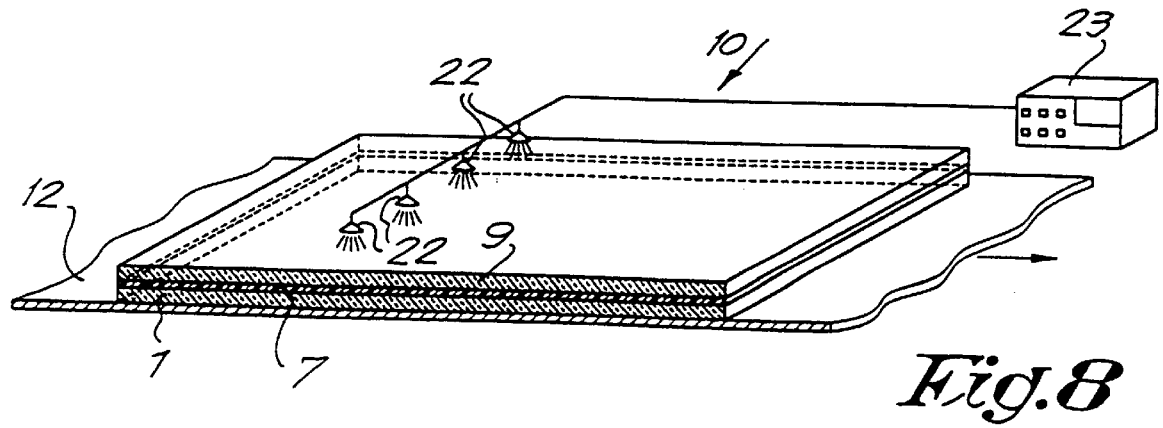

In order to press the whole consisting of the two glass plates 1 and 9 and the layer 7 together, use is made of a compression device 25 which, as represented in FIG. 7, consists for example of at least one row of pressure rollers 26 which occupy the entire width of the support 2 and in between which the whole is guided. The pressure rollers 26 are pushed towards one another by the pressure cylinders 27, such that an equal pressure is exerted over the entire width of the glass plates 1 and 9 and the remaining air between the top glass plate 9 and the layer 7 is pressed out.

Figure 5:
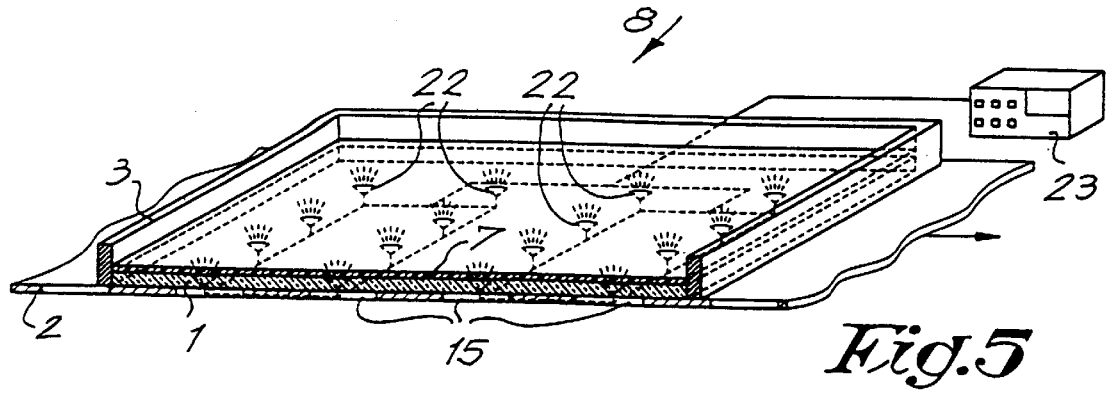

The radiation device 10 with which the layer 7 is entirely polymerized is represented in FIG. 5. This radiation device 10 comes immediately after the compression device 25 and spans the entire width of the glass plate. The ultraviolet lamps of the radiation device 10 can be of the same type or another type than those of the radiation device 8. They may consist of lamps of a mixed type which radiate ultraviolet light as well as infrared light (UV/IR). The lamps can be placed in a single or in several rows.

According to a variant, one or several rows of ultraviolet lamps or lamps of a mixed type can be placed under and/or on top of the laminate and immediately after the compression device. To this end, a groove is provided between the press and the bearing table behind it.

When a third or subsequent glass plate is applied, the different stages according to the above-described method can now be repeated, from the application of the confinement 3 to the radiation with the radiation device 10 included, for every added glass plate.

For example, already after the application of the second plate and before the compression of the whole, the different stages of the method from the application of the confinement to the positioning of a third and subsequent glass plate on a second and following, partially cured layer, can already be repeated as a function of the number of glass plates required, after which the whole is sent only then through the compression device 25 and the radiation device 10.

Before they are placed on the support 2, the layer 7 respectively, the different glass plates can be treated with an adhesive medium such as for example acryl-functional silane for glass plates, and for example with a phosphoric acid acrylate or methacrylate ester for metal plates.

This treatment will reinforce the bond of the polymerizable layer to the glass plates during the polymerization, so that the risk of delamination is further restricted.

According to a special embodiment, a co-polymerizable layer, a layer which colours or tones the glass plate, an ultraviolet light absorbing layer or such can be applied on the glass plates.

It is clear that an ultraviolet light absorbing layer must always be applied in a preparation stage on the top glass plate if the radiation is carried out from below.

With certain embodiments of the above-described method, fixed objects such as conducting wires, burglary sensors, solar cells, screens and such can be provided in the space 4 before the layer 7 is applied.

With the above-described method are obtained very high polymerization speeds, for example from 5 seconds to a couple of minutes, so that a very high productivity can be obtained which is competitive as compared to the methods for manufacturing laminates which make use of PVB film.

Based on the largest dimensions of glass plates (6 m×3.2 m) and with a fully automated device, a production of 150 to 190 $m^2/h$ of laminates can be obtained.

FIGS. 9 to 19 show the invention, this is a variant of an embodiment according to the one in FIGS. 1 to 8, whereby the partial curing of the layer 7 is obtained by making use of a mask which is placed under the glass plate 1 or on top of the resin layer 7 during the radiation with the device 8 so as to obtain that the partially cured parts of the resin form a pattern in the layer 7, such that not only an efficient support is obtained for the second glass plate 9 thanks to the partially cured layer 7, but that as it were very minuscule passages are created on the surface of the resin layer 7, so that the discharge of air, which may possibly remain in or on the surface of the layer 7, is improved while the glass plates 1–9 are pressed together.

The height of the partially cured resin parts will indeed differ from the height of the non-cured resin parts, as a result of which these minuscule passages are created.

Moreover, the aim of the alternative method according to FIGS. 9 to 19 is that, if required or if necessary, the glass plates 1–9 can be pressed together with the resin layer 7 in between them at an angle in relation to the horizontal line, so that an even better discharge of possible air is obtained.

Further, the method according to these FIGS. 9 to 19 is identical to the method as described by means of FIGS. 1 to 8, except for the use of a mask.

Figure 9:
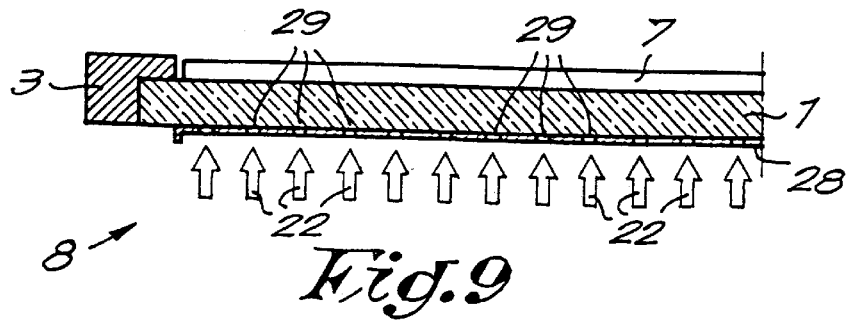
FIG. 9 represents schematically the part F5 of FIG. 1 but whereby a mask is used and thus for applying the method according the invention.
Figure 11:
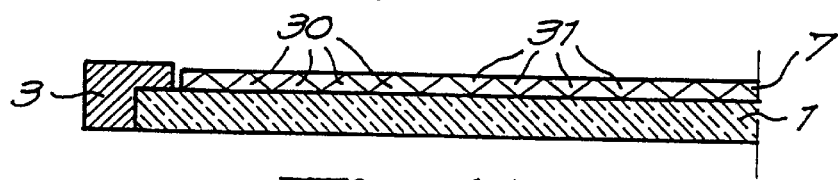
FIG. 11 shows a partial section of the result obtained after the partial curing according to FIG. 10.

FIG. 9 shows that a mask 28 is placed under the glass plate 1, such that the radiation of the radiation source 22 can reach the layer 7 through openings 29 in the mask 28 so as to obtain that, as is represented in FIG. 11, parts 30 are formed in this layer 7 which are partially cured and parts 31 in between them which are not cured.

Figure 10:
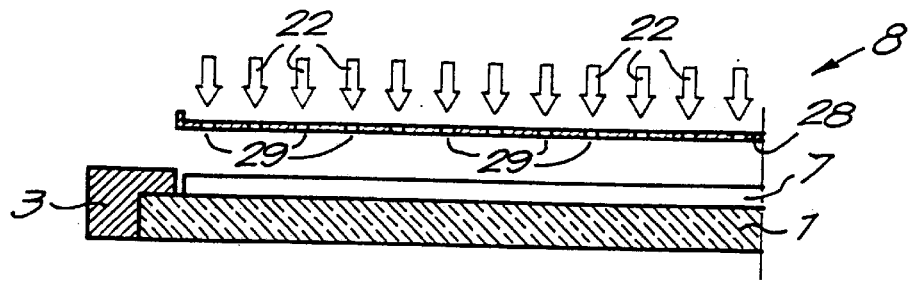
FIG. 10 shows a view similar to that in FIG. 9, but for a variant of the invention.

FIG. 10 shows a variant thereof whereby the mask 28 is placed on top of the layer 7, either or not at a certain, possibly adjustable distance from this layer 7 so as to influence the degree of polymerization also in this manner.

The mask 28 can be made in any way whatsoever of an opaque material such as paper, cardboard, metal or such and in which the appropriate pattern is cut out or etched.

Of course, such a mask can also be made of a plastic film upon which the required pattern is printed, a glass or plastic plate printed with paint or ink, etc.

The mask 28 can either be provided permanently in the support 2 or such, in particular between the radiation sources 22 and the layer 7, or it can, in the case of a continuous working method, whereby the UV-exposure takes place through a gap in the support 2, be made as a moving element, for example in the shape of an infinite loop, which moves between the radiation sources 22 and the layer 7, simultaneously and synchronously with the latter.

The exposure through the mask 28 causes partially or entirely cured parts 30 in the layer 7, next to non-cured parts 31, whereby the cured parts 30, in other words the parts which have been exposed by the radiation sources 22, ensure the uniform support and an optimal parallelism between the glass plates 1 and 9, whereas the liquid, non-cured parts make sure that the top glass plate 9 is maximally moistened with resin; that a very good bond of the glass plate 9 with said resin is obtained; and that there is a possibility for the glass plates 1 and 9 with the resin 7 provided in between them to be placed at an angle for a certain time without the resin running down, before and during the pressing, by means of the rollers 26.

Examples of masks are shown in the accompanying FIGS. 12 to 15.

The pattern of such masks will show a specific design, depending on the compression method. This design or pattern may for example be radial, as in the profile section of a rain tyre, according to the direction in which the laminate is pressed together.

The pattern may also run concentrically from the geometrical centre of the plate 1.

In all cases, the pattern functions not only as the required support for the glass plate 9 on the cured parts 30 as mentioned above, but it also very clearly serves as a very appropriate evacuation system for air bubbles which may be found at the boundary layer between the layer 7 and the glass plate 9, because passages are formed as it were, be it with a very minimal height, due to the difference in height which is formed by the cured and non-cured parts 30 and 31 respectively.

The required polymerization degree of the resin is determined by the length and intensity of the radiation by means of the radiation sources 22.

The entire radiation through a mask 28 moreover is very advantageous in that the exposure time of the resin is much less critical than with a method according to FIGS. 1 to 8. Indeed, there will always remain a sufficient amount of liquid resin 31 to moisten the glass plate 9.

Moreover, it is also possible to obtain sharper or less sharp edges between the cured resin parts by for example making the transitions in the pattern change gradually from non-translucent to translucent, for example via grey densities.

Another possibility is to change the distance between the mask 28 and the layer 7 of polymerizable resin during the radiation.

Figure 16:
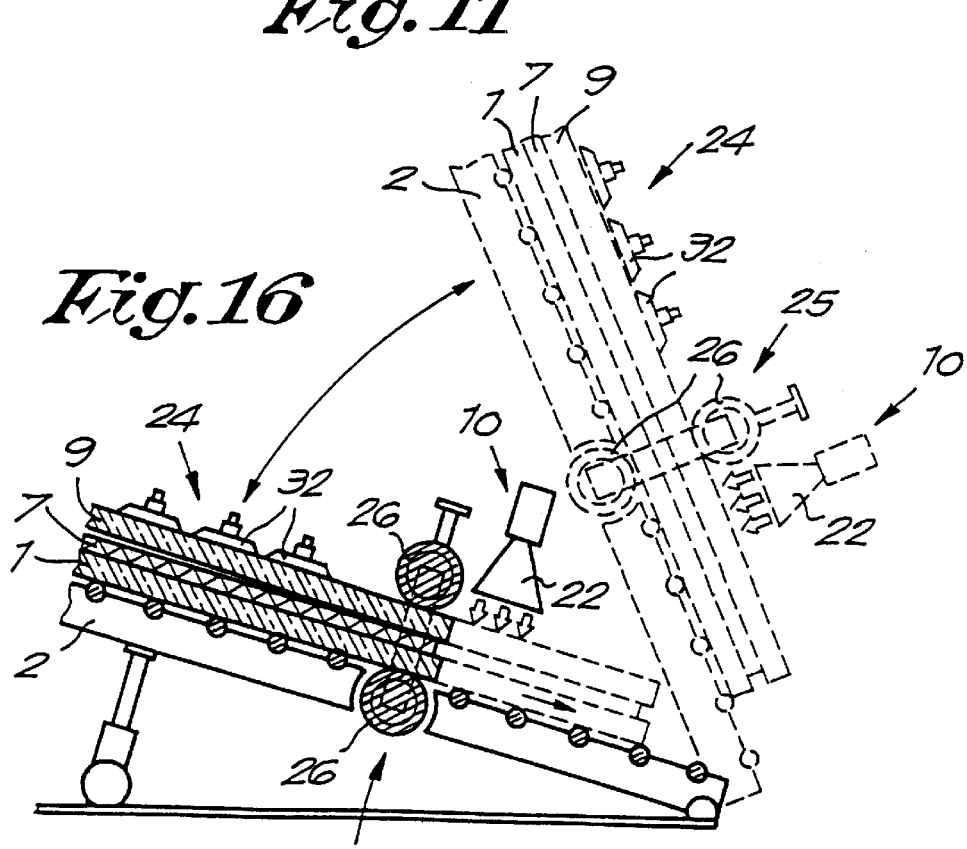
FIG. 16 shows a schematic arrangement of a device whereby the parts F6, F7 and F8 of FIG. 1 can be inclined according to the invention.
Figure 12:
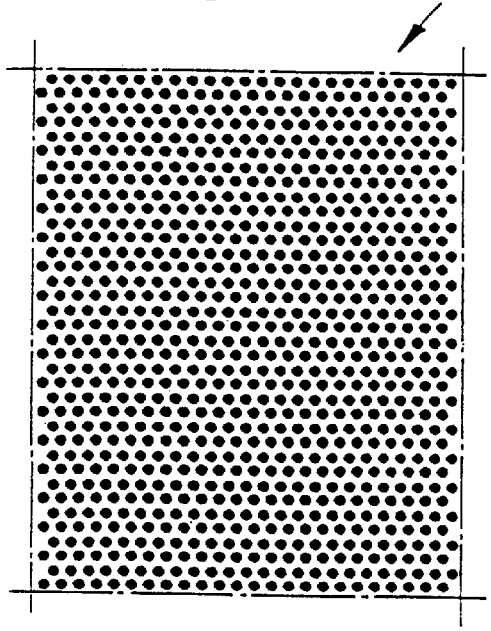
FIGS. 12, 13, 14 and 15 show some examples of possible masks.
Figure 13:
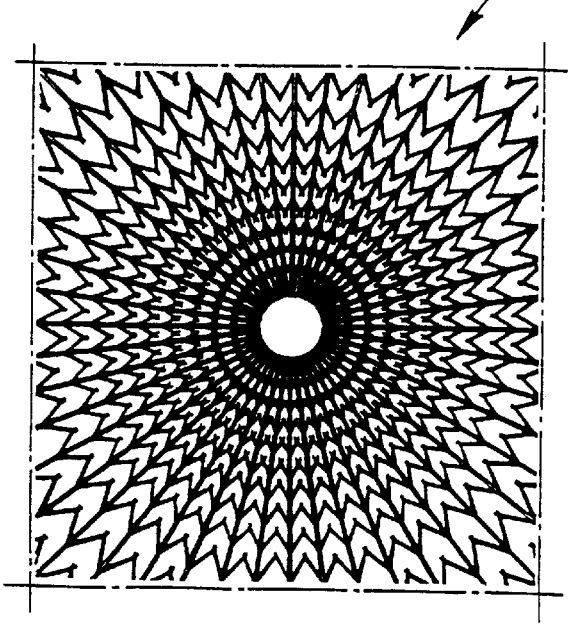
Figure 14:
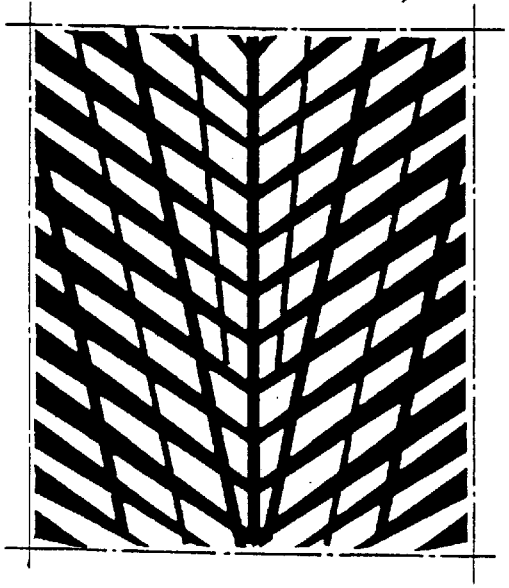
Figure 15:
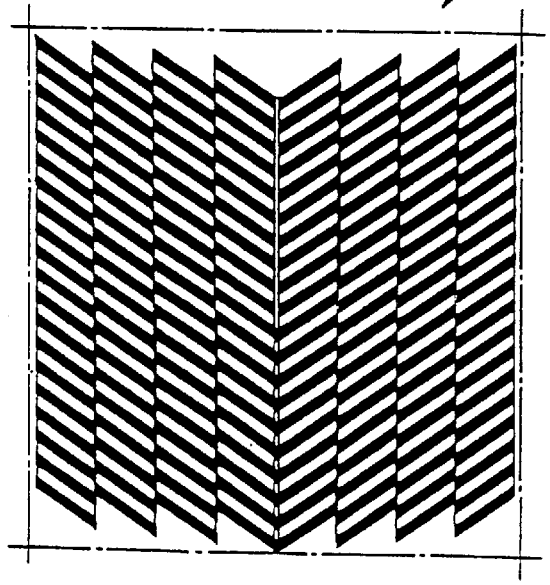

FIG. 16 shows an example of the compression method which can be applied very advantageously and which consists in hanging the glass plate 9 at a small angle over the layer 7 by means of a suitable glass lifting device 24, which is for example mainly formed of suction cups 32, after which the support 2, together with the glass lifting device 24 is tilted from a horizontal position into any position whatsoever which may vary as required.

The above-mentioned whole can for example be placed at an angle by means of a pneumatic or hydraulic cylinder.

The glass plate 9 is then put into contact with the layer 7 at its lower end, right in front of the pressure rollers 26, whereby the glass plate 9 is kept as far away as possible from the layer 7 in front of these pressure rollers by means of the suction cups 32 of the lifting device 24 and/or by means of lateral guides for the glass plate 9, after which the layers can be pressed together at a required fixed angle or at a slowly increasing angle.

In any case, the method makes it possible for air bubbles which may possibly be entrapped in the resinous compound or air bubbles which are situated between the resinous compound and the top plate 9 to be easily removed.

When the thus compressed plates go past the pressure rollers 26, the whole is radiated for the second time with a powerful UV-source 10 until the resin layer 7 is entirely cured.

FIG. 17 shows yet another embodiment whereby the device according to FIG. 16 is part of a revolving table 33 which can turn around a shaft and whereby, between parts of the support 2, a gap 34 is provided through which the layer 7 is radiated.

This radiation takes place via a mask 28 which is in this case formed of for example an endless belt which moves continuously and synchronously along at the propelling speed of the resin 7 between said resin and the radiation source 22.

FIG. 19 finally shows a device whereby the mask 28 consists of a belt which is unrolled from a roller 35, rolled up respectively on a roller 36.

The present invention is by no means restricted to what is described above; on the contrary, such a method for manufacturing a laminate and a device to apply this method can be made in all sorts of variants while still remaining within the scope of the invention.

In particular, the plates do not necessarily need to be glass plates, but they can also be plates of a synthetic material, metal and such. However, the condition is that the bottom plate or the plate situated on top of the polymerizable resin layer must always be entirely or partially transparent to ultraviolet light if the radiation takes place from the lower side or from the top side of the support 2 respectively.

I claim:

1. Method for manufacturing a laminate consisting of at least two plates, which are attached to one another by means of an intermediate layer of a polymerizable resin, whereby a layer (7) of the polymerizable resin is applied on a horizontally placed first plate (1), the layer (7) is first partly polymerized, and a second plate (9) is applied on this partly polymerized layer (7), after which the obtained whole is pressed together and the above-mentioned partly polymerized layer (7) is entirely polymerized, characterized in that the first partial polymerization of the layer (7) is a photopolymerization by radiation through a mask (28) and the entire polymerization after the whole is pressed together is a photopolymerization by radiation.

2. Method according to claim 1, characterized in that, before the layer of resin (7) is applied, a confinement (3) is applied along the edges of the first plate (1) so as to form a tub-shaped, leak-tight space (4) for the resin.

3. Method according to claim 1, characterized in that a laminate is manufactured consisting of more than two plates, and that at least one subsequent layer of photopolymerizable resin is provided with each subsequent plate, whereby also each subsequent layer of resin is first partly photopolymerized by radiation through a mask before a plate is placed upon it and whereby also each layer of partly polymerized resin is further photopolymerized after a plate is placed and pressed upon it.

4. Method according to claim 1, characterized in that a photopolymerizable resin is applied which is a mixture which contains one or several prepolymers, and contains one or several components of the group consisting of acrylic and methacrylic monomers, vinyl monomers, ethylene monomers, oligomers, photo initiators, additives to improve the stability, adhesion promoters and shrinkage reducers.

5. Method according to claim 1, characterized in that a layer (7) of photopolymerizable resin is applied whose viscosity is situated between 500 and 50,000 mPa.sec.

6. Method according to claim 1, characterized in that plates (1–9) are pre-treated with adhesive mediums of acryl-functional silane or phosphoric acid acrylate or methacrylate ester which promote the bond to the adjacent plates.

7. Method according to claim 1, characterized in that one of the plates (1–9) is pre-treated with a co-polymerizable layer which is a colour layer, a tone layer, an ultraviolet light absorbing layer, a bond-improving layer, or a combination thereof.

8. Method according to claim 1, characterized in that at least one of the plates (1–9) used for the manufacturing of the laminate is a glass plate.

9. Method according to claim 1, characterized in that at least one of the plates (1–9) is made of other materials than glass plastic or metal, whereby one of the plates must always be entirely or partially transparent to the radiation for photopolymerization, however.

10. Method according to claim 1, characterized in that the mask (28) is placed under the first glass plate (1) or on top of the layer (7) before the layer (7) is subjected to the first polymerization.

11. Method according to claim 1, characterized in that before the whole is pressed together, the second plate (9) is placed at a small angle opposite the layer (7) to be subsequently gradually pressed against the layer (7).

12. Method according to claim 11, characterized in that while the whole is being compressed, the latter is placed at an angle itself.

13. Device to apply the method according to claim 1, comprising a level support (2), a first device (6) to apply a layer (7) of polymerizable resin, a second device (8) to partially polymerize the layer (7), a compression device (25) and a fourth device (10) to further polymerize the layer (7) until it is entirely polymerized, characterized in that said second device (8) is a radiation device for photopolymerizing and is combined with a mask (28), and the fourth device (10) is a radiation device for photopolymerizing.

14. Device according to claim 13, characterized in that the mask (28) is movably mounted in relation to the plate (1), and the layer (7) respectively.

15. Device according to claim 13, characterized in that the mask (28) is formed of a pattern which consists of translucent and non-translucent parts.

16. Device according to claim 15, characterized in that the translucent parts of the mask (28) gradually change into non-translucent parts.

17. Device according to claim 14, characterized in that the mask (28) is formed of a loop which moves under the plate (1) or over the layer (7), whereby the second device for partial polymerization of layer (7) by radiation is provided inside this loop.

18. Device according to claim 14, characterized in that the mask (28) is formed of a strip which unrolls from a roller (35), rolls up on a roller (36) respectively, whereby a part of this strip goes under the plate (1) or over the layer (7) and whereby the second device for partial polymerization of layer (7) by radiation (22) is erected next to this strip.

19. Device according to claim 17, characterized in that the mask (28) moves at a speed which is equal to the propelling speed of the plate (1) with the layer (7) provided on it.

20. Device according to claim 14, characterized in that it comprises means for holding the second plate (9) at a small angle, in relation to the plate (1) with the layer (7) provided upon it just before or during the compression.

21. Device according to claim 14, characterized in that it comprises means for placing the support (2) at an angle during the compression.

22. Device according to claim 21, characterized in that said means for placing at angle, comprise a hydraulic or pneumatic cylinder provided under the support (2).

23. Device according to claim 21, characterized in that said means for placing at angle, comprise a revolving table (33).

* * * * *